(12) United States Patent
Chen et al.

(10) Patent No.: US 11,005,847 B2
(45) Date of Patent: May 11, 2021

(54) METHOD, APPARATUS AND COMPUTER PROGRAM PRODUCT FOR EXECUTING AN APPLICATION IN CLOUDS

(71) Applicant: EMC IP Holding Company LLC, Hopkinton, MA (US)

(72) Inventors: Fei Chen, Beijing (CN); Fucai Liu, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 334 days.

(21) Appl. No.: 16/295,181

(22) Filed: Mar. 7, 2019

(65) Prior Publication Data

US 2019/0327238 A1   Oct. 24, 2019

(30) Foreign Application Priority Data

Apr. 20, 2018   (CN) .......................... 201810359410.3

(51) Int. Cl.
*H04L 29/06* (2006.01)
*G06F 21/62* (2013.01)

(52) U.S. Cl.
CPC ........ *H04L 63/102* (2013.01); *G06F 21/6245* (2013.01); *H04L 63/105* (2013.01)

(58) Field of Classification Search
CPC .. H04L 63/102; H04L 63/105; G06F 21/6245
See application file for complete search history.

(56) References Cited

U.S. PATENT DOCUMENTS

| 6,308,208 | B1* | 10/2001 | Jung | ................... | G06F 11/3006 |
| | | | | | 709/201 |
| 6,983,460 | B1* | 1/2006 | Goire | ...................... | G06F 9/445 |
| | | | | | 717/175 |
| 2010/0058431 | A1* | 3/2010 | McCorkendale | ....... | G06F 21/57 |
| | | | | | 726/1 |

(Continued)

OTHER PUBLICATIONS

U.S. Appl. No. 16/244,937 filed in the name of Fei Chen et al. filed Jan. 10, 2019 and entitled "Method, Device and Computer Program Product for Performing Applications in Hybrid Cloud."

*Primary Examiner* — Shin-Hon (Eric) Chen
(74) *Attorney, Agent, or Firm* — Ryan, Mason & Lewis, LLP (57) ABSTRACT

Embodiments of the present disclosure provide a method, apparatus and computer program product for executing an application in clouds. In the method according to an embodiment of the present disclosure, an application execution request from a user for executing an application in clouds is received. In response to the application execution request, a monitoring module and a protection data configuration are uploaded into a runtime environment, the protection data configuration defining sensitive data which are not allowed to be accessed by a user of low authorization level. By the monitoring module, data input and data output of the user during execution of the application are monitored based on the protection data configuration to prevent the user of low authorization level from accessing the sensitive data. Embodiments of the present disclosure can achieve effective protection for sensitive data during the process of executing the application.

16 Claims, 6 Drawing Sheets

(56) References Cited

U.S. PATENT DOCUMENTS

| | | | |
|---|---|---|---|
| 2010/0146269 A1* | 6/2010 | Baskaran | G06F 21/10 |
| | | | 713/165 |
| 2012/0227113 A1* | 9/2012 | Wise | G16H 30/20 |
| | | | 726/29 |
| 2018/0025135 A1* | 1/2018 | Odom | H04L 63/08 |
| | | | 726/28 |
| 2018/0232517 A1* | 8/2018 | Roth | H04L 63/10 |
| 2019/0132289 A1* | 5/2019 | Hulick, Jr. | H04L 63/0245 |
| 2019/0236282 A1* | 8/2019 | Hulick, Jr. | G06F 16/951 |

\* cited by examiner

METHOD, APPARATUS AND COMPUTER PROGRAM PRODUCT FOR EXECUTING AN APPLICATION IN CLOUDS

RELATED APPLICATION(S)

The present application claims priority to Chinese Patent Application No. 201810359410.3, filed Apr. 20, 2018, and entitled "A Method Apparatus and Computer Program Product for Executing an Application in Clouds," which is incorporated by reference herein in its entirety.

FIELD

Embodiments of the present disclosure generally relate to the field of cloud technology, and more specifically, to a method, apparatus and computer program product for executing an application in clouds.

BACKGROUND

At present, there already exist technologies and applications that employ multiple clouds to provide online computing services, storage services and so on. Users can store their own data in the clouds and deploy and run their applications in the clouds.

A Field Programmable Gate Array (FPGA) is a digital integrated circuit that can be configured by the user to achieve desired functions. Recently, people have begun to apply FPGAs in clouds, and it is becoming a trend to utilize FPGAs in clouds. For example, cloud systems like Amazon Web Service AWS, Nimbix Cloud, and Huawei Cloud are configured with FPGAs. The user can reconfigure an FPGA with special binary data so that the FPGA can become a hardware accelerator for some applications. For example, it is possible to reconfigure compressed/decompressed FPGA binary data into an FPGA to accelerate the file compression application Gzip. FPGA binary data are generally stored in a specific location in the application in the form of a binary file, and in use, it is necessary to copy both workload data of the user and the FPGA binary file into the run-time environment in the clouds.

However, some security problems might be incurred when FPGAs are used in the clouds. In the prior art, for security purposes, a software license mechanism has been used to provide protection for the software. Nevertheless, an FPGA binary file itself is data used for a hardware circuit, rather than software in a general sense. Therefore, the software license mechanism for providing protection for the software cannot be used to protect the FPGA binary file. Meanwhile, an FPGA device in the cloud is provided as common shared hardware. Therefore, when the FPGA binary file is configured in the FPGA hardware through a standard application programming interface (API), no encryption measures will be taken. In such a case, as long as the user can touch these unencrypted binary files or access the application runtime environment, he can duplicate the FPGA binary file and use these data elsewhere.

However, these FPGA binary files are typically developed by a team of experts or purchased from a third party, and thus are of high value. Hence, in an enterprise environment, it is generally unallowable for those who run the application to access these valuable FPGA binary files. Thus, how to protect valuable FPGA binary files when an application runs in an external cloud becomes an urgent problem to be solved.

SUMMARY

Embodiments of the present disclosure provide a solution for executing an application in clouds to solve or at least partly mitigate at least a part of the problem in the prior art.

In a first aspect of the present disclosure, there is provided a method for executing an application in clouds. The method comprises receiving an application execution request from a user for executing an application in clouds. The method further comprises in response to the application execution request, uploading a monitoring module and a protection data configuration in a runtime environment, wherein the protection data configuration defines sensitive data which are not allowed to be accessed by a user of low authorization level. The method further comprises monitoring, by the monitoring module, data input and data output of a user during execution of the application based on the protection data configuration to prevent the user of low authorization level from accessing the sensitive data.

In a second aspect of the present disclosure, there is provided an apparatus for executing an application in clouds. The apparatus comprises a processor and a memory coupled to the processor, the memory having instructions stored thereon which, when executed by the processor, cause the apparatus to perform acts. The acts comprise receiving an application execution request from a user for executing an application in clouds. The acts further comprise in response to the application execution request, uploading a monitoring module and a protection data configuration in a runtime environment, wherein the protection data configuration defines sensitive data which are not allowed to be accessed by a user of low authorization level. The acts further comprise monitoring, by the monitoring module, data input and data output of a user during execution of the application based on the protection data configuration to prevent the user of low authorization level from accessing the sensitive data.

In a third aspect of the present disclosure, there is provided an apparatus for executing an application in clouds. The apparatus comprises: an executor frontend, an executor backend, and a monitoring module. The executor frontend may be configured to receive an application execution request from a user for executing an application in clouds. The executor backend may be configured to, in response to the application execution request from the executor frontend, upload a monitoring module and a protection data configuration in a runtime environment, wherein the protection data configuration defines sensitive data which are not allowed to be accessed by a user of low authorization level. The monitoring module may be configured to monitor data input and data output of a user during execution of the application based on the protection data configuration to prevent the user of low authorization level from accessing the sensitive data.

In a fourth aspect of the present disclosure, there is provided a computer program product tangibly stored on a computer readable medium and comprising machine executable instructions which, when executed, cause a machine to perform the method according to the first aspect.

This Summary is provided to introduce a selection of concepts in a simplified form that are further described below in the Detailed Description. This Summary is not intended to identify key features or essential features of the present disclosure, nor is it intended to limit the scope of the present disclosure.

BRIEF DESCRIPTION OF THE DRAWINGS

The above and other objectives, features, and advantages of the present disclosure will become more apparent through the detailed description of example embodiments of the present disclosure with reference to the accompanying drawings, where the same reference symbols generally represent the like elements in example embodiments of the present disclosure.

DETAILED DESCRIPTION

Principles of the present disclosure will now be described with reference to various example embodiments illustrated in the drawings. Although preferred embodiments of the present disclosure are displayed in the drawings, it is to be understood that description of those embodiments is merely to enable those skilled in the art to better understand and further implement the present disclosure, and is not intended to limit the scope of the present disclosure in any manner.

As used herein, the term "includes/comprises" or the like and their derivatives are to be read as open terms that mean "includes, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least another embodiment." The terms "first," "second" and others can denote different or identical objects. The following text may also contain other explicit or implicit definitions.

Figure 1:
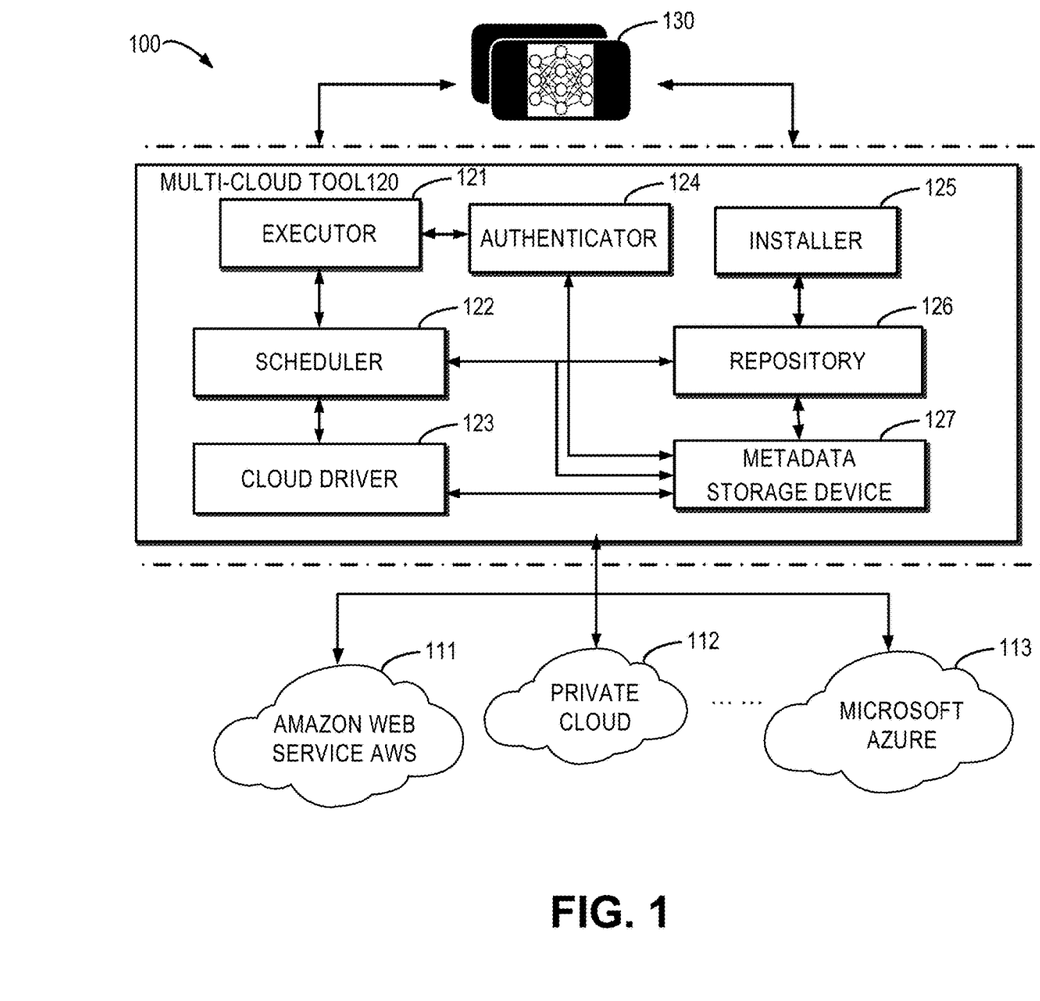
FIG. 1 is a schematic diagram illustrating an example environment in which embodiments of the present disclosure may be implemented.

FIG. 1 is a schematic diagram illustrating an example environment 100 in which a device and/or method according to embodiments of the present disclosure may be implemented. In this environment, there are a plurality of clouds, such as Amazon Web Service AWS 111, private cloud 112, Microsoft Azure 113 and so on, as shown in FIG. 1. The plurality of clouds, for instance, may be a hybrid cloud of a heterogeneous device for use by the user, and as a matter of course, they may also be multi-clouds not having a heterogeneous device. It is to be noted that the multi-clouds shown in FIG. 1 are only examples, rather than for limiting multi-clouds, and the multi-clouds may include any number of clouds.

The multi-cloud tool 120 includes an executor 121, a scheduler 122, a cloud driver 123, an authenticator 124, an installer 125, a repository 126 and a metadata storage device 127. The multi-cloud tool 120 is configured to receive a request for executing an application from the user device 130 and then to deploy an executable file corresponding to the requested application into the cloud. The multi-cloud tool 120 may be configured on a computing device of the user or on a server. Moreover, the multi-cloud tool may be connected to the cloud in various manners, for instance, connected to respective clouds in the multiple clouds through a network.

The executor 121 is configured to receive the request from the user for executing an application and then obtain from the request at least an identifier of the application to be executed. The user request may further include files or data using the application. Alternatively or additionally, the user request may further include some parameters which may be application-default parameters. At least a part of these parameters are configurable by the user.

The scheduler 122 receives an identifier of the application from the executor 121. Then, the scheduler selects the identifier of the corresponding executable file from the repository 126 based on the received application identifier and scheduling policy, the identifier of the executable file being an identifier of the executable file of the application applicable to the heterogeneous device in the hybrid cloud. In an example, the scheduling policy may be configured for the user in advance in the multi-cloud tool or pre-determined by the user. Besides, the scheduling policy may be further determined by the multi-cloud tool by any one or more of: determining it based on a learning algorithm, determining it based on the scheduling policy in which the user previously used the multi-cloud tool, determining it based on the scheduling policy in which other users use the application, determining it based on costs for using the heterogeneous device, determining it based on policy related to information on the performance of the heterogeneous device or data security, etc., or determining it based on user's requirements in a certain aspect (for instance, time consumption, expenditure and so on). The scheduler 122 may further obtain application executable files corresponding to the identifier of the application from the repository 126 and then these executable files may be deployed in the heterogeneous device in the clouds to execute the application with different types of heterogeneous devices.

The installer 125 is configured to receive the user's request for installing the application, to generate, from the received source code of the application, executable files corresponding to the type of the heterogeneous devices in the hybrid cloud, and to store the executable files in the repository 126. In an example, the hybrid cloud tool is further arranged with a configurator which stores configuration information of each cloud in the hybrid cloud connected with the hybrid cloud tool. The configuration information includes, for instance, identifier information of heterogeneous devices in each cloud, the type of the heterogeneous devices and so on. Alternatively or additionally, the configuration information further includes information related to account for logging into each cloud so that the hybrid cloud tool can log into each cloud. The installer 125 obtains type information of the heterogeneous device from the configurator.

The repository 126 is used for storing executable files of the application. To facilitate searching executable files, the repository 126 further stores an application index associated with the generated executable files, identifiers of the executable files, cloud identifier and device identifier information. Alternatively, the corresponding application index, identifiers of the executable files, cloud identifier and device identifier are stored in the repository 126 as an item of information. Alternatively or additionally, the item of information may further include other information needed to be stored by the user.

The metadata storage device 127 stores metadata of the application therein, and the metadata include at least application index, cloud identifier, device identifier and information on devices' performance, usage cost and/or security. In an example, the metadata may further include the following information: application index, cloud A, device A and cost per certain amount of data per hour. Alternatively or additionally, the metadata may further include application index, cloud identifier, device identifier, clock frequency, power consumption and the like. Alternatively or additionally, the metadata may further include account information associated with the user. Alternatively or additionally, the metadata may include user level information corresponding to the application index and the user account, and the level information may determine types of devices the user can use.

The cloud driver 123 is used for deploying the executable files of the application into multi-clouds. In an example, the cloud driver 123 uses account information about the cloud from the configurator to log into and interact with the cloud. The cloud driver 123 may be used to create a virtual machine to execute the application in the multi-clouds and deploy executable files of the application into the heterogeneous device in the corresponding cloud.

The authenticator is used to authenticate the user, for example, it performs the authentication based on the account information of the user and application index. The authentication level of the user can be determined by authenticating the user, and the authentication level determines resources available to the user.

In the example application environment shown in FIG. 1, authorization and authentication can be utilized to determine whether the user can execute the application. However, some security problems may still be incurred when an FPGA is used in the cloud. As depicted above, the FPGA binary files are configuration data of the hardware, rather than software. Therefore, the software license mechanism for providing protection for the software cannot be used to protect FPGA binary files. Besides, due to its sharing nature, it is impossible to apply any encryption technology thereto. However, FPGA binary files are generally valuable for the enterprise and thus, in an enterprise environment, those running the application are not allowed to access these valuable FPGA binary files. As a result, there exists a problem of how to protect valuable FPGA binary files when an application runs in an external cloud.

To this end, the present disclosure provides a solution for protecting sensitive data like FPGA binary files during the process of executing an application to solve or at least partly mitigate at least a part of the problems in the prior art. According to this scheme, when a runtime environment is created, a monitoring module and a protection data configuration will be injected therein, and with the monitoring module, data input and data output during the execution of the application are monitored based on the protection data configuration to prevent the user from accessing sensitive data. Reference will be made to FIGS. 2-6 below to depict the solution for executing an application in the clouds proposed herein. It should be noted in particular that although reference will be made to the example environment shown in FIG. 1 for depiction of the following embodiments, the present disclosure is not limited thereto and it can be applied to any environment that has similar problems.

Figure 2:
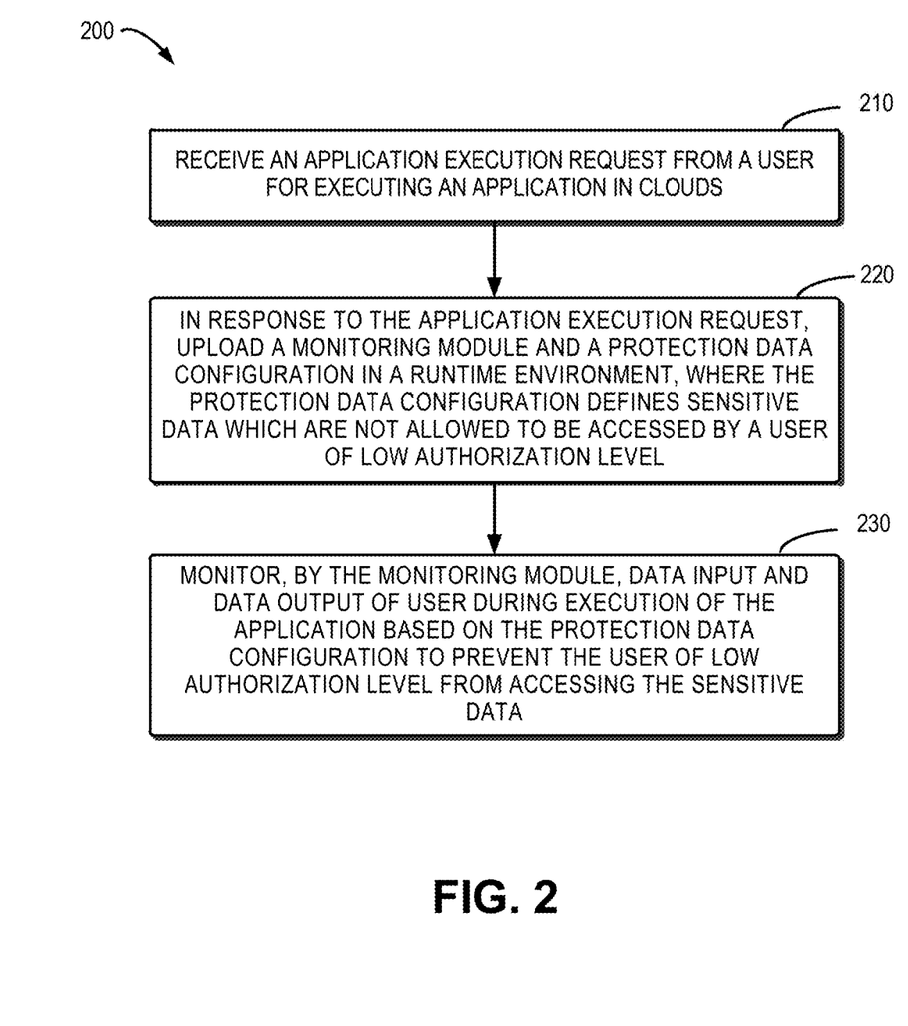
FIG. 2 is a flowchart illustrating a method for executing an application in clouds in accordance with an embodiment of the present disclosure.

First, reference will be made to FIG. 2 to depict a method 200 for executing an application in the clouds proposed herein, wherein FIG. 2 is a flowchart illustrating a method for executing an application in the clouds in accordance with an embodiment of the present disclosure.

As shown in FIG. 2, firstly, in step 210, an application execution request for executing an application in the clouds is received from the user. When the user needs to execute the application in multi-clouds, he/she may issue a request for using the application to the multi-cloud tool via a user operation interface. The request may include, for instance, an application index of the application that the user wishes to execute. Moreover, it may include a data input list, a data output list and some related parameters, which parameters may be application-default parameters or parameters configured by the user. In an example, an example form of the application execution request received by the executor may be, for instance, {application index, parameter, {input data list: data 1, data 2, . . . }, {output data list: output 1, output 2, . . . }}.

Next, in step 220, in response to the application execution request, a monitoring module and a protection data configuration are loaded into the runtime environment. The protection data configuration, for instance, may be a protection table which defines sensitive data such as FPGA binary files.

After the application execution request is received, if the user has an authorization to execute the application, a virtual machine (VM) may be started in the selected external cloud to create the runtime environment. In an embodiment, the reception of the application execution request may be performed under a lower user authorization level, while the creation of the runtime environment may be performed at a higher authorization level. Because of running at the higher authorization level, it is possible to obtain all the necessary information for controlling the runtime environment. Examples of such information include IP address of VM, account information (such as username, password and so on) for logging into VM and the like. Therefore, the runtime environment may be created based on the application execution request. For example, it is possible to retrieve the required binary files from the repository based on application index and transmit these sensitive binary files into the runtime environment without encryption. However, since the retrieval of required binary files and the transmission of binary files are performed at high authorization level when the runtime environment is created, the transmission is totally isolated from the user of low authorization level and the user cannot have any access to sensitive data.

Moreover, to protect sensitive data like FPGA binary files, the monitoring module and the protection data configuration are loaded into the runtime environment, which is realized through Linux secure shell (SSH) protocol and Linux secure copy (SCP) protocol. The loading of the monitoring module and the protection data configuration may also be performed at a higher authorization level than the authorization level at which the application execution request is received, thereby ensuring the reliability and security of the monitoring module and the protection data configuration.

The protection data configuration, for instance, may be a protection table which defines, for instance, sensitive data of an FPGA. Moreover, the corresponding access authority may also be further defined. In other words, the protection data configuration defines which content is sensitive data in need of special protection, or which data cannot be accessed by a user of lower authorization level. For example, a list of binary files that are required to be marked as sensitive data may be recorded therein. An example form is {Path_to_File_A: True; Path_to_File_B: True; Path_to_File_C: False}, where True indicates having been marked as sensitive data and False denotes not having been marked as sensitive data. In addition, it is possible to further define the corresponding access authority.

The monitoring module is configured to provide monitoring services for data input and data output during the execution of the application and it may have a higher authorization level.

Next, in step 230, it is possible to monitor the data input and data output of the user during the execution of the application based on the protection data configuration by the monitoring module to prevent the user of low authorization level from accessing the sensitive data.

The monitoring module may monitor data input and data output of the user during the execution of the application based on protection data configuration, so as to prevent the user of low authorization level from accessing the sensitive data, namely, writing and reading of sensitive data (for example, viewing, duplicating and so on).

In an embodiment of the present disclosure, data input and data output may be performed via a predetermined port, and the monitoring module monitors the data input and data output on the predetermined port and in response to determining that the data input or the data output involves accessing of sensitive data defined in the protection data configuration, prevents the execution of the data input or the data output.

For example, the monitoring module is configured to monitor at least one IP port. When the monitoring module is started, it may return an IP port parameter to the backend of the executor. The frontend of the executor may perform data communication with the backend of the executor via the IP port. The backend of the executor will monitor this IP port and control data transmission between the executor frontend and executor backend based on information in the protection data configuration table, to only allow non-sensitive data to be transmitted between the local environment and the runtime environment, while prohibiting user of low authorization level from accessing sensitive data.

All the input data may be transmitted through the returned IP port from the local environment to the runtime environment so as to realize monitoring of data input by the monitoring module, thereby preventing a user of low authorization level, for instance from writing the sensitive data. The data output of the user may also be downloaded through the IP port provided by the monitoring module, which enables the monitoring module to monitor data output so that the user of low authorization level can only download data unmarked as sensitive data in the protection data configuration to the local environment and cannot download other sensitive data. In this way, by means of the monitoring module and the protection data configuration, the user of low authorization level can be isolated from the sensitive data so as to provide effective protection for sensitive data and improve its security.

Figure 3:
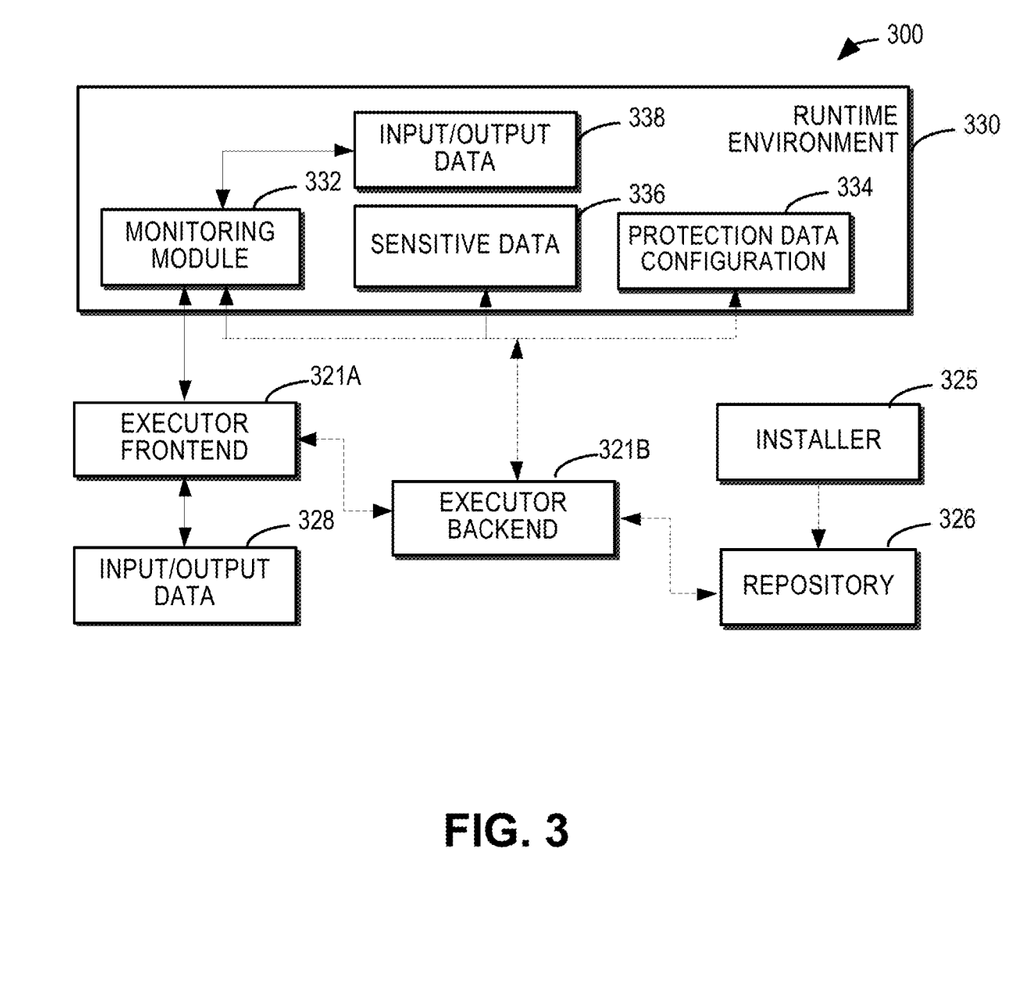
FIG. 3 is a block diagram illustrating a system for executing an application in clouds in accordance with an embodiment of the present disclosure.

FIG. 3 is a block diagram illustrating a system for executing an application in clouds in accordance with an embodiment of the present disclosure. It is to be noted that for the sake of simplicity, only those parts that are related to the solution proposed in the present disclosure are shown in FIG. 3, and this does not mean that other parts not shown will definitely not be included in a specific implementation.

As shown in FIG. 3, system 300 includes an executor frontend 321A, an executor backend 321B, an installer 325 and a repository 326. The executor frontend 321A may be used for interfacing with the user, for instance, receiving the user's application execution request and returning the result of application execution to the user. The executor frontend 321A may run at a low authorization level. The executor backend 321B may be used for background processing, and it may perform a corresponding processing for the application execution request, such as creating a runtime environment 330, starting a sensitive data protection function and so on, and may run at a higher authorization level. In an embodiment of the present disclosure, the executor backend 321B may run on a device isolated from the executor frontend.

The installer 325 is a module for installing an application. When the user requests to install an application, the installer 325, in response to the user request, performs application installation. The installer 325 may store executable files and other data information of the application in, for instance, the repository 326 and/or any other suitable databases and return the application index of the installed application to the user. In this way, the user may utilize this application index to execute the application and it can be ensured that the user cannot get direct access to the execution files of the application.

The executor backend 321B may be responsible for creating the runtime environment 330 of the application for the user. The executor backend 321B may read the required binary files and data from the repository based on the application index of the application and transmit them to the runtime environment 330, as indicated by the sensitive data 336 shown in the figure. Particularly, to enable a sensitive data protection function, the executor backend 321B may further inject the monitoring module 332 and the protection data configuration 334 in the runtime module.

The protection data configuration 334 may be a protection table, for instance, which defines sensitive data like FPGA binary files. Moreover, it is further possible to define the corresponding access authority. For example, a list of binary files that are required to be marked as sensitive data may be recorded therein. An example form is {Path_to_File_A: True; Path_to_File_B: True; Path_to_File_C: False}, where True indicates having been marked as sensitive data and False denotes not having been marked as sensitive data.

The monitoring module 332 is configured to provide a monitoring service for data input and data output during the execution of the application and it may have a higher authorization level. The user input may be uploaded to the runtime environment 330 from the local environment of the user under monitoring of the monitoring module 332 and the output data generated by application execution are also stored in the runtime environment 330 and may be downloaded to the local environment of the user under monitoring of the monitoring module. Data input and data output may be performed through a predetermined port. The monitoring module 332 may be further configured to monitor data input and data output on the predetermined port and in response to determining that the data input or the data output involves accessing of sensitive data defined in the protection data configuration 334, to prevent the execution of the data input or the data output.

In the solution according to the present disclosure, protection for sensitive data is performed under a high authorization level and thus it has high security and reliability. Meanwhile, the user of a low authorization level is only granted with a limited data use function so as to achieve protection for sensitive data.

Figure 4:
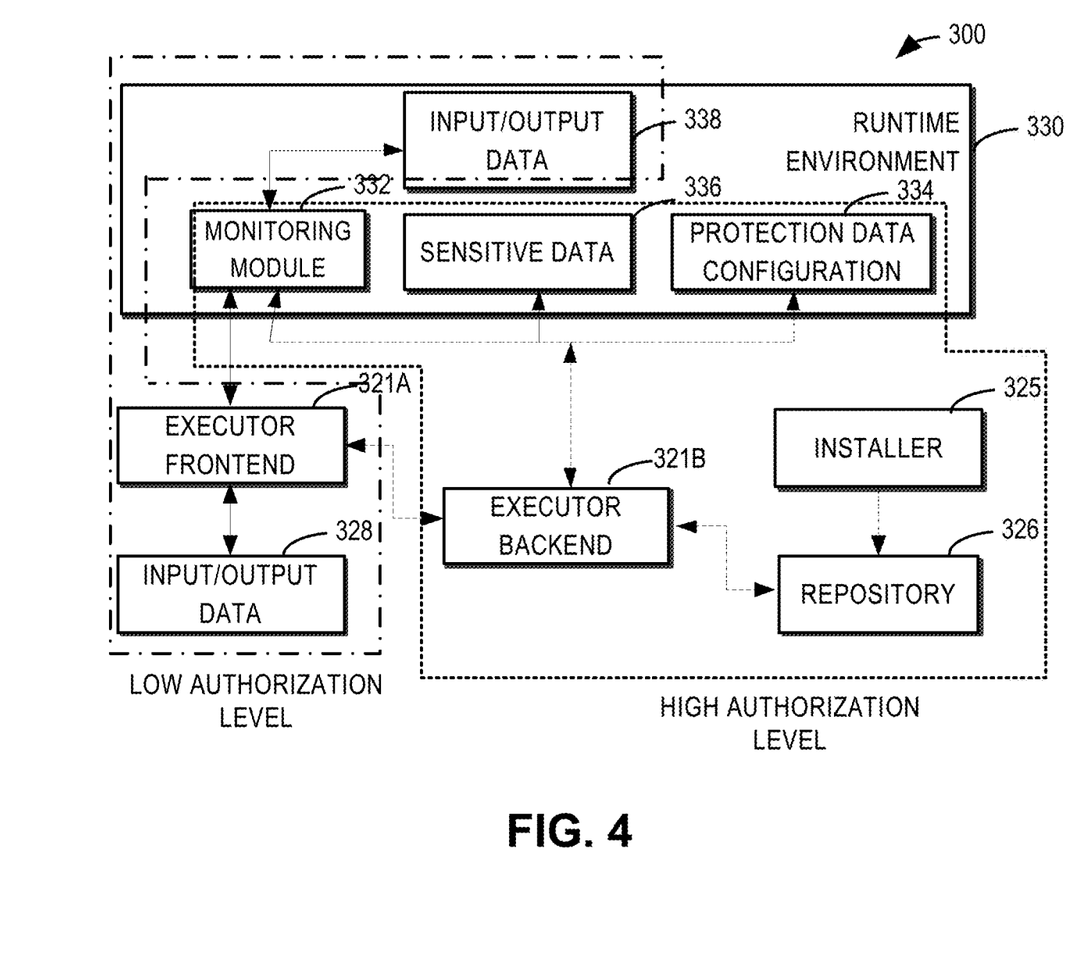
FIG. 4 is a schematic diagram illustrating authorization levels of respective modules in a system for executing an application in clouds in accordance with an embodiment of the present disclosure.

FIG. 4 schematically illustrates the authorization levels of respective models of the system shown in FIG. 3. As shown in FIG. 4, the modules in the dot-dashed blocks include input/output data 328 in the local environment, an executor frontend 321A, and input/output data 338 in the runtime environment. These modules may perform operations under a lower authorization level. Modules in the dashed boxes include a monitoring module 332, sensitive data 336, protection data configuration 334, an executor backend 321B, an installer 325 and a repository 326 and these modules may perform operations at a higher authorization level. In this manner, the user of lower authorization level may be isolated from the sensitive data so that he/she has no access to sensitive data, thereby providing effective protection for sensitive data that cannot be protected through a software license mechanism.

Next, for illustrative purposes, reference will be made to FIG. 5 to illustrate a specific example of a process 500 for executing an application in clouds in accordance with an embodiment of the present disclosure.

Figure 5:
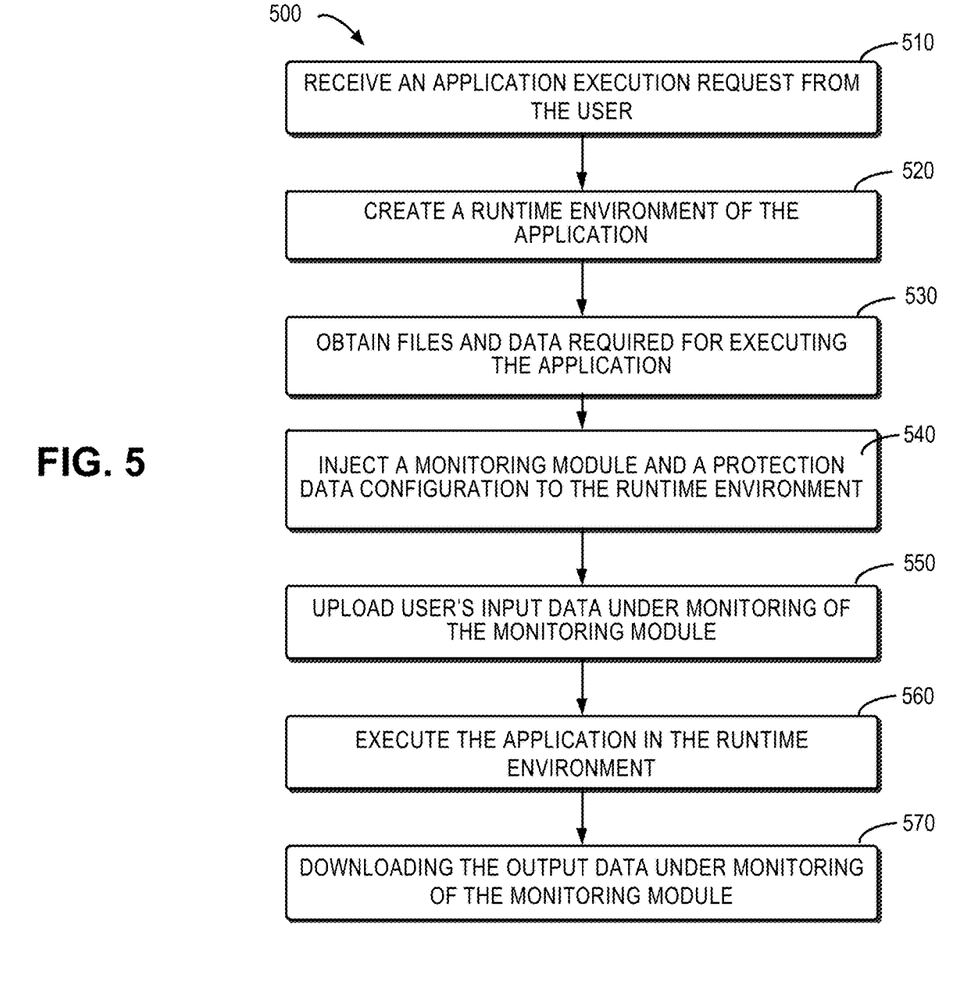
FIG. 5 is a flowchart illustrating a specific process for executing an application in clouds in accordance with an embodiment of the present disclosure.

As shown in FIG. 5, firstly, in step 510, an application execution request is received from the user. When the user needs to execute the application in multi-clouds, he/she may issue a request for using the application to the multi-cloud tool via a user operation interface. The request may include, for instance, the application index of the application that the user desires to execute, and it may further include input/output data 328, for example, data input list, data output list, and some related parameters which may be application-default parameters or parameters configured by the user. In an example, an example form of the input recited by the executor may be, for instance, {application index, parameter, {input data list: data 1, data 2, . . . }, {output data list: output 1, output 2, . . . }}.

The executor frontend 321A receives an application execution request for executing an application in the cloud from the user. When the user has an authority to execute the application, the executor frontend 321A may transmit an operating request with an application index to the executor backend 321B.

Next, in step 520, a runtime environment of the application is created. The executor backend 321B, for instance, may start a virtual machine (VM) in the corresponding external cloud based on the operating request to create a runtime environment. In such a case, since the executor has a higher authorization level, it will have all necessary information for controlling the runtime environment. Examples of the information include IP address of the VM, account information (such as username, password and so on) for logging into VM and the like.

Then, in step 530, files and data required for execution of the application may be retrieved and uploaded to the runtime environment. The executor backend 321B, for instance, may read all the binary files and data from the repository based on the application index and transmit these sensitive data (for instance, FPGA binary files) to the runtime environment without encryption. Since the transmission of the binary files is performed at a higher authorization level, the transmission of sensitive binary files is completely isolated from the user of the lower authorization level and thus the user cannot have any access to sensitive data 336.

Next, in step 540, the monitoring module and the protection data configuration are injected into the runtime environment to enable the sensitive data protection function. When the VM has been ready and can be logged in by the user, the executor backend 321B may load the monitoring module and the protection data configuration in the runtime environment, which can be realized through, for instance, Linux SSH protocol, Linux SCP protocol and so on. Here, the protection data configuration is, for instance, a protection table which defines, for instance, sensitive data of an FPGA. In other words, the protection data configuration defines which contents are sensitive data in need of special protection, and additionally, it may further define the user of which authorization level can access the data and/or the user of which authorization level cannot access the data.

The monitoring module provides monitoring service and it may have a higher authorization level and monitor data input and data output of the user during execution of the application based on the protection data configuration, so as to prevent the user of low authorization level from accessing the sensitive data, namely, writing and reading (such as viewing, duplicating and so on) of the sensitive data. The monitoring module is configured to monitor at least one IP port. The executor frontend may communicate with the executor backend via the IP port. The executor backend will control data transmission between the executor frontend and the executor backend through the IP port based on information in the protection data configuration table, so as to only allow non-sensitive data to be transmitted between the local environment and the runtime environment while prohibiting a user of a low authorization level from accessing the sensitive data.

When the monitoring module is initiated, it may return, to the executor backend, the IP port parameters which will be further returned to the executor frontend.

Next, in step 550, under monitoring of the monitoring module, the user input data may be uploaded to the runtime environment. The executor frontend may transmit all the input data from the local environment to the runtime environment through the returned IP port, so as to realize monitoring of data input via the monitoring module, thereby preventing the user of the low authorization level, for instance, from writing the sensitive data.

Then, in step 560, it may begin to execute the application in the runtime environment based on input data. When both the application and the input data have been ready in the runtime environment, the application may be executed under monitoring of the monitoring module. The result for executing the application is stored in the runtime environment.

In step 570, the output data are downloaded under monitoring of the monitoring module. The data output of the application may be downloaded via the IP port provided by the monitoring module. Thus, the monitoring module may control data output so that user of a low authorization level can only download data not included in the protection data configuration to the local environment and cannot download any sensitive data. In this way, by means of the monitoring module and the protection data configuration, the user of low authorization level can be isolated from the sensitive data so as to maintain security of the sensitive data.

Figure 6:
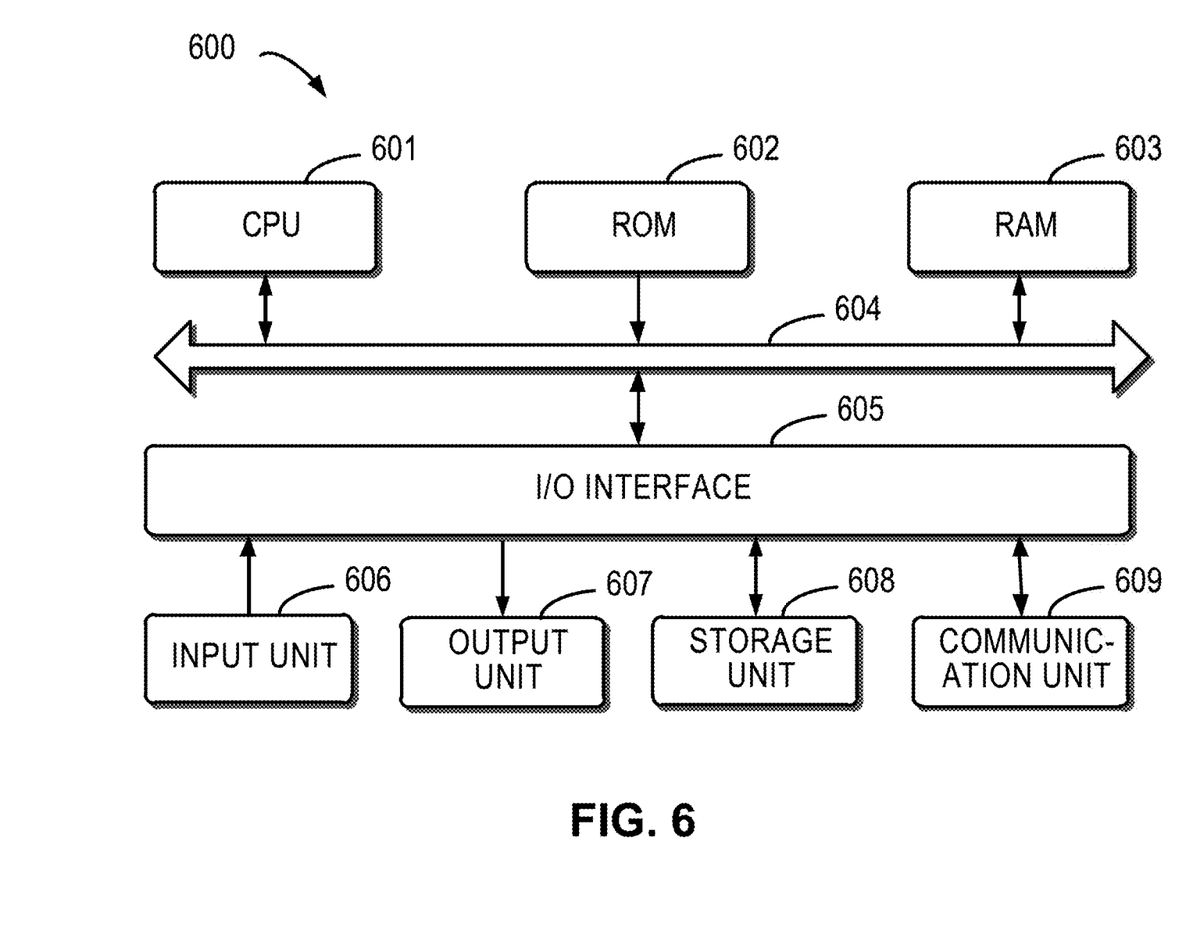
FIG. 6 is a block diagram illustrating an example device that may be used to implement embodiments of the present disclosure.

FIG. 6 is a schematic block diagram illustrating an example device 600 that may be used to implement embodiments of the present disclosure. For example, one or more of respective modules in the multi-cloud tool shown in FIG. 1, modules 321A, 321B, 325 and 326 in FIG. 3 and respective modules in the runtime environment 330 may be implemented by the device 600. As illustrated, the device 600 comprises a central processing unit (CPU) 601 which can perform various appropriate actions and processing based on the computer program instructions stored in a read-only memory (ROM) 602 or computer program instructions loaded into a random access memory (RAM) 603 from a storage unit 608. The RAM 603 also stores various types of programs and data required by operating the storage device 600. CPU 601, ROM 602 and RAM 603 are connected to each other via a bus 604 to which an input/output (I/O) interface 605 is also connected.

Various components in the device 600 are connected to the I/O interface 605, including: an input unit 606, such as a keyboard, a mouse and the like; an output unit 607, such as various types of displays, loudspeakers and the like; a storage unit 608, such as magnetic disk, optical disk and the like; and a communication unit 609, such as network card, modem, wireless communication transceiver and the like. The communication unit 609 enables the device 600 to exchange information/data with other devices via computer networks such as Internet and/or a variety of telecommunication networks.

The processing unit 601 performs various methods and processes as described above, such as the method 200 and process 500. For example, in some embodiments, each of the method 200 and process 500 can be implemented as computer software programs, which are tangibly included in a machine-readable medium, such as the storage unit 608. In some embodiments, the computer program can be partially or completely loaded and/or installed to the device 600 via the ROM 602 and/or the communication unit 609. When the computer program is loaded to the RAM 603 and executed by the CPU 601, one or more acts of the above described method 200 or process 500 can be implemented.

Embodiments of the present disclosure may be implemented by a method, an apparatus, a system and/or a computer program product. The computer program product may include a computer readable storage medium having computer readable program instructions thereon for carrying out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, FPGAs, or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which comprises one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for executing an application in one or more clouds, comprising:
   receiving an application execution request from a user having a first authorization level for executing an application in one or more clouds, the application execution request comprising an application index for the requested application;
   creating a runtime environment of the application for the user, retrieving data and files required for executing the application based at least in part on the application index and transmitting the data and files required for executing the application to the runtime environment, wherein creating the runtime environment, retrieving the data and files required for executing the application and transmitting the data and files required for executing the application to the runtime environment are performed at a second authorization level that is higher than the first authorization level of the user from which the application execution request is received;
   in response to receiving the application execution request, uploading a monitoring module and a protection data configuration into the runtime environment, wherein the protection data configuration defines sensitive data which are not allowed to be accessed by a user of the first authorization level; and
   monitoring, by the monitoring module, data input and data output of the user during execution of the application based on the protection data configuration to prevent the user of the first authorization level from accessing the sensitive data.

2. The method according to claim 1, wherein the monitoring data input and data output is performed at an authorization level higher than the first authorization level at which the application execution request is received.

3. The method according to claim 1, wherein the uploading a monitoring module and a protection data configuration is performed at an authorization level higher than the first authorization level at which the application execution request is received.

4. The method according to claim 1, wherein the data input and the data output are performed through a predetermined port, and the monitoring data input and data output of a user during execution of the application comprises:
   monitoring data input and data output on the predetermined port; and in response to determining that the data input or the data output involves accessing sensitive data defined in the protection data configuration, preventing execution of the data input or the data output.

5. The method according to claim 1, wherein the sensitive data comprise field programmable gate array (FPGA) binary files.

6. A computer program product tangibly stored on a non-transitory computer readable medium and comprising machine executable instructions which, when executed, cause a machine to perform the method according to claim 1.

7. An apparatus for executing an application in one or more clouds, comprising:
   a processor; and
   a memory coupled to the processor, the memory having instructions stored thereon which, when executed by the processor, cause the apparatus to perform acts comprising:
      receiving an application execution request from a user for executing an application in one or more clouds, the application execution request comprising an application index for the requested application;
      creating a runtime environment of the application for the user, retrieving data and files required for executing the application based at least in part on the application index and transmitting the data and files required for executing the application to the runtime environment, wherein creating the runtime environment, retrieving the data and files required for executing the application and transmitting the data and files required for executing the application to the runtime environment are performed at a second authorization level that is higher than the first authorization level of the user from which the application execution request is received;
      in response to receiving the application execution request, uploading a monitoring module and a protection data configuration into the runtime environment, wherein the protection data configuration defines sensitive data which are not allowed to be accessed by a user of the first authorization level; and
      monitoring, by the monitoring module, data input and data output of the user during execution of the application based on the protection data configuration to prevent the user of the first authorization level from accessing the sensitive data.

8. The apparatus according to claim 7, wherein the monitoring data input and data output is performed at an authorization level higher than the first authorization level at which at which the application execution request is received.

9. The apparatus according to claim 7, wherein the uploading a monitoring module and a protection data configuration is performed at an authorization level higher than the first authorization level at which the application execution request is received.

10. The apparatus according to claim 7, wherein the data input and the data output are performed through a predetermined port, and the monitoring data input and data output of a user during execution of the application comprises:
    monitoring data input and data output on the predetermined port; and
    in response to determining that the data input or the data output involves accessing sensitive data defined in the protection data configuration, preventing execution of the data input or the data output.

11. The apparatus according to claim 7, wherein the sensitive data comprise field programmable gate array (FPGA) binary files.

12. An apparatus for executing an application in one or more clouds, comprising:
a processor; and
a memory coupled to the processor, the memory having instructions stored thereon which, when executed by the processor, cause the apparatus to implement:
an executor frontend configured to receive an application execution request from a user for executing an application in one or more clouds, the application execution request comprising an application index for the requested application;
an executor backend configured:
to create a runtime environment of the application for the user, retrieving data and files required for executing the application based at least in part on the application index and transmitting the data and files required for executing the application to the runtime environment, wherein creating the runtime environment, retrieving the data and files required for executing the application and transmitting the data and files required for executing the application to the runtime environment are performed at a second authorization level that is higher than the first authorization level of the user from which the application execution request is received; and
to, in response to receiving the application execution request from the executor frontend, upload a monitoring module and a protection data configuration into the runtime environment, wherein the protection data configuration defines sensitive data which are not allowed to be accessed by a user of the first authorization level; and
the monitoring module configured to monitor data input and data output of the user during execution of the application based on the protection data configuration to prevent the user of the first authorization level from accessing the sensitive data.

13. The apparatus according to claim 12, wherein at least one of:
an authorization level of the monitoring module is higher than that of the executor frontend; and
an authorization level of the executor backend is higher than that of the executor frontend.

14. The apparatus according to claim 12, wherein the data input and the data output are performed via a predetermined port, and the monitoring module is further configured to:
monitor data input and data output on the predetermined port; and
in response to determining that the data input or the data output involves accessing of sensitive data defined in the protection data configuration, prevent execution of the data input or the data output.

15. The apparatus according to claim 12, wherein at least one of:
the application execution request comprises an application index for the requested application; and
the sensitive data comprise field programmable gate array (FPGA) binary files.

16. The apparatus according to claim 15, wherein the executor backend is further configured to:
create a runtime environment of an application for the user, retrieving data and files required for executing the application based on the application index, and transmitting data and files required for executing the application to the runtime environment,
wherein the executor backend creates the runtime environment, retrieves data and files required for executing the application and transmits data and files required for executing the application at an authorization level higher than that of the executor frontend.

* * * * *